United States Patent
Bhoja

(10) Patent No.: US 9,020,346 B2
(45) Date of Patent: Apr. 28, 2015

(54) OPTICAL COMMUNICATION INTERFACE UTILIZING CODED PULSE AMPLITUDE MODULATION

(71) Applicant: Inphi Corporation, Santa Clara, CA (US)

(72) Inventor: Sudeep Bhoja, San Jose, CA (US)

(73) Assignee: Inphi Corporation, Santa Clara, CA (US)

( * ) Notice: Subject to any disclaimer, the term of this patent is extended or adjusted under 35 U.S.C. 154(b) by 84 days.

(21) Appl. No.: 13/791,201

(22) Filed: Mar. 8, 2013

(65) Prior Publication Data

US 2014/0169789 A1   Jun. 19, 2014

Related U.S. Application Data

(60) Provisional application No. 61/714,543, filed on Oct. 16, 2012, provisional application No. 61/699,724, filed on Sep. 11, 2012.

(51) Int. Cl.
| | |
|---|---|
| *H04B 10/272* | (2013.01) |
| *H04B 10/40* | (2013.01) |
| *H04J 14/00* | (2006.01) |
| *G02B 6/26* | (2006.01) |
| *H04B 10/54* | (2013.01) |

(52) U.S. Cl.
CPC .............. *H04B 10/272* (2013.01); *H04B 10/40* (2013.01); *H04B 10/541* (2013.01)

(58) Field of Classification Search
CPC ..................... H04B 10/1125; H04B 10/25753; H04B 10/25752
USPC ....................................... 398/43, 45, 115, 116
See application file for complete search history.

(56) References Cited

U.S. PATENT DOCUMENTS

| | | | |
|---|---|---|---|
| 7,380,993 B2 * | 6/2008 | Dallesasse ...................... 385/89 |
| 7,389,046 B1 * | 6/2008 | Tanaka et al. ................... 398/45 |
| 7,941,053 B2 * | 5/2011 | Dallesasse ..................... 398/139 |
| 8,103,137 B2 * | 1/2012 | Kirkpatrick et al. ............ 385/17 |
| 8,270,830 B2 * | 9/2012 | Kirkpatrick et al. ............ 398/45 |
| 2002/0078408 A1 | 6/2002 | Chambers et al. |
| 2002/0166091 A1 * | 11/2002 | Kidorf et al. ................... 714/752 |
| 2003/0180041 A1 * | 9/2003 | Azadet ............................ 398/25 |
| 2006/0294443 A1 | 12/2006 | Fekih-Romdhane |
| 2008/0069570 A1 * | 3/2008 | Dallesasse .................... 398/139 |

(Continued)

FOREIGN PATENT DOCUMENTS

KR   10-2010-0134046 A   12/2010

OTHER PUBLICATIONS

Office Action for U.S. Appl. No. 13/797,814, dated Apr. 3, 2014.

(Continued)

*Primary Examiner* — Oommen Jacob
(74) *Attorney, Agent, or Firm* — Richard T. Ogawa; Ogawa P.C.

(57) ABSTRACT

The present invention is directed to communication system and methods. More specifically, various embodiments of the present invention provide a communication interface that is configured to transfer data at high bandwidth using PAM format(s) over optical communication networks. In certain embodiments, the communication interface is used by various devices within a spine-leaf network architecture, which allows large amount of data to be shared among servers.

25 Claims, 16 Drawing Sheets

(56) References Cited

U.S. PATENT DOCUMENTS

| | | | |
|---|---|---|---|
| 2009/0154500 A1* | 6/2009 | Diab et al. | 370/477 |
| 2010/0254703 A1* | 10/2010 | Kirkpatrick et al. | 398/45 |
| 2012/0072562 A1* | 3/2012 | Johnsen et al. | 709/223 |
| 2012/0148242 A1 | 6/2012 | Chen et al. | |
| 2012/0250679 A1 | 10/2012 | Judge et al. | |
| 2013/0156425 A1* | 6/2013 | Kirkpatrick et al. | 398/45 |
| 2014/0169499 A1* | 6/2014 | Riani et al. | 375/298 |
| 2014/0169789 A1* | 6/2014 | Bhoja | 398/45 |

OTHER PUBLICATIONS

James F. Buckwalter et al., "A Monolithic 25-Gb/s Transceiver With Photonic Ring Modulators and Ge Detectors in a 130-nm CMOS SOI Process", IEEE Journal of Solid-State Circuits, Jun. 2012, pp. 1309-1322, vol. 47, No. 6.
International Search Report and Written Opinion for PCT/US2014/021436, filed Mar. 6, 2014.

* cited by examiner

Figure 4B

| Uncoded Bits 0-2 | X1 | Y1 |
|---|---|---|
| 000 | -1 | -1 |
| 001 | -1 | 0 |
| 010 | 0 | 1 |
| 011 | -1 | 1 |
| 100 | 0 | -1 |
| 101 | 1 | -1 |
| 110 | 0 | 0 |
| 111 | 1 | 0 |

| Coded Bits | X2 |
|---|---|
| 00 | -3 |
| 01 | -1 |
| 11 | +1 |
| 10 | +3 |

| Coded Bits | Y2 |
|---|---|
| 00 | -3 |
| 01 | -1 |
| 11 | +1 |
| 10 | +3 |

BCH Check Bits

Modified Parity on Parity

Data: (57*57*4) = 12996
Total: (63*63*4) = 15876
Row Parity: t=3 BCH, Column parity: t = 3 BCH BCH Check Symbols

Figure 13

OPTICAL COMMUNICATION INTERFACE UTILIZING CODED PULSE AMPLITUDE MODULATION

CROSS-REFERENCES TO RELATED APPLICATIONS

This provisional patent application claims priority from U.S. Provisional Patent Application No. 61/714,543, filed Oct. 16, 2012, titled "100 G PA CODED MODULATION", and U.S. Provisional Patent Application No. 61/699,724, filed Sep. 11, 2012, titled "ADAPTIVE ECC FOR FLASH MEMORY", which are incorporated by reference herein for all purposes.

BACKGROUND OF THE INVENTION

The present invention is directed to data communication system and methods.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Over the past, there have been many types of communication systems and methods. Unfortunately, they have been inadequate for various applications. Therefore, improved communication systems and methods are desired.

BRIEF SUMMARY OF THE INVENTION

The present invention is directed to data communication system and methods. More specifically, various embodiments of the present invention provide a communication interface that is configured to transfer data at high bandwidth using PAM format(s) over optical communication networks. In certain embodiments, the communication interface is used by various devices, such as spine switches and leaf switches, within a spine-leaf network architecture, which allows large amount of data to be shared among servers.

It is to be appreciated that embodiments of the present invention provide numerous benefits and advantages over existing techniques. Among other things, the spine-leaf architecture combined with PAM formats used in optical communication links, servers within this architecture can share large amount of data quickly and efficiently, thereby allowing improved virtualization and collaboration of servers compared to existing systems. For example, a communication interface according to an embodiment of the present invention provides 1.2 Tb/s of bandwidth. In a specific embodiment, the present invention provides 3.2 Gb/s or higher bandwidth. A single spine server can have 32 ports configured at 100 Gb/s each. In addition, the PAM-based optical communication interface as described in various implementations of the present invention are energy efficient, with a power consumption of about 3 W compared to 12 W of power consumption of a similarly specified conventional system. For example, a communication interface according to the present invention can be integrated with other components, thereby reducing the total size. There are many other benefits as well.

BRIEF DESCRIPTION OF THE DRAWINGS

FIG. 4B is simplified diagram illustrating the use of BCH check symbols for PAM mapping.

FIG. 9 is a simplified diagram illustrating PAM12 mapping according to an embodiment of the present invention.

FIG. 12 is a simplified diagram illustrating BCH code construction according to an embodiment of the present invention.

FIG. 13 is a simplified diagram illustrating Reed-Solomon (RS) code construction used in PAM format according to embodiments of the present invention.

DETAILED DESCRIPTION OF THE INVENTION

Figure 1:
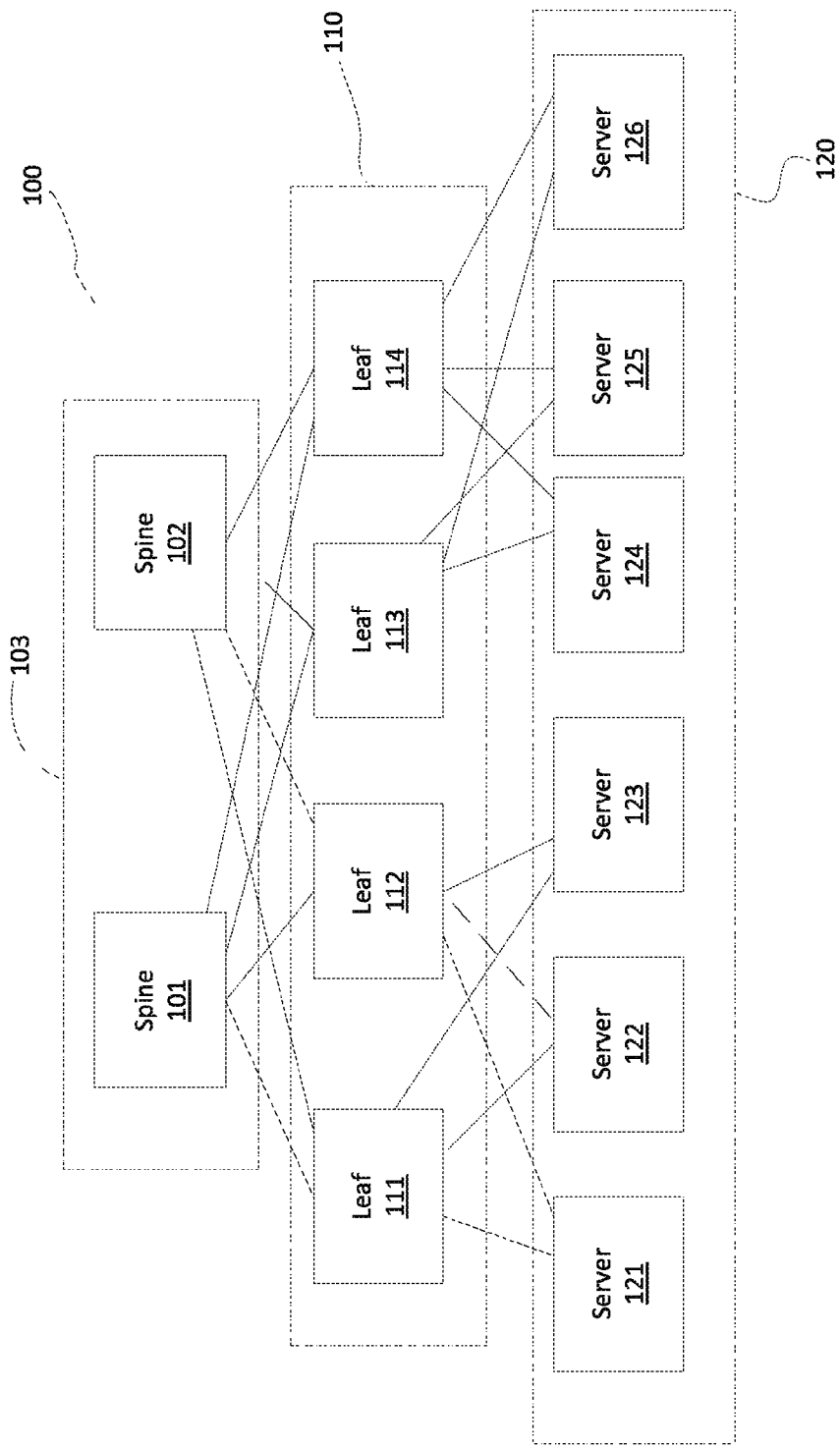
FIG. 1 is a simplified diagram illustrating a leaf-spine architecture 100 according to an embodiment of the present invention.

The present invention is directed to data communication system and methods. More specifically, various embodiments of the present invention provide a communication interface that is configured to transfer data at high bandwidth using PAM format(s) over optical communication networks. In certain embodiments, the communication interface is used by various devices within a spine-leaf network architecture, which allows large amount of data to be shared among servers.

In the last decades, with advent of cloud computing and data center, the needs for network servers have evolved. For example, the three-level configuration that have been used for a long time is no longer adequate or suitable, as distributed applications require flatter network architectures, where server virtualization that allows servers to operate in parallel. For example, multiple servers can be used together to perform a requested task. For multiple servers to work in parallel, it is often imperative for them to be share large amount of information among themselves quickly, as opposed to having data going back forth through multiple layers of network architecture (e.g., network switches, etc.).

Leaf-spine type of network architecture is provided to better allow servers to work in parallel and move data quickly among servers, offering high bandwidth and low latencies. Typically, a leaf-spine network architecture uses a top-of-rack switch that can directly access into server nodes and links back to a set of non-blocking spine switches that have enough bandwidth to allow for clusters of servers to be linked to one another and share large amount of data.

In a typical leaf-spine network today, gigabits of data are shared among servers. In certain network architectures, network servers on the same level have certain peer links for data sharing. Unfortunately, the bandwidth for this type of set up is often inadequate. It is to be appreciated that embodiments of the present invention utilizes PAM (e.g., PAM8, PAM12, PAM16, etc.) in leaf-spine architecture that allows large amount (up terabytes of data at the spine level) of data to be transferred via optical network.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified diagram illustrating a leaf-spine architecture 100 according to an embodiment of the present invention. This diagram is merely an example, which should not unduly limit the scope of the claims. One of ordinary skill in the art would recognize many variations, alternatives, and modifications. The leaf-spine architecture 100 comprises servers 120, leaf switches 110, and spine switches 103. It is to be appreciated that depending on the need and specific application, the number and arrangement of the servers and switches may be changed. As shown in FIG. 1, each server may be connected to more than one leaf switch. For example, server 121 is connected to leaf switches 111 and 112. Similarly, server 122 is connected to leaf switches 111 and 112, and so is server 123. In an exemplary embodiment, server 121 is connected to the leaf switch 111 via optical communication link utilizing pulse amplitude modulation (PAM). PAM2, PAM4, PAM8, PAM12, PAM16, and/or other variations of PAM may also be used in conjunction with optical communication links in various embodiments of the present invention. The bandwidth of the optical communication link between the server 121 and leaf switch 111 can be over 10 gigabits/s. Each leaf switch, such as leaf switch 111, may be connected to 10 or more servers. In one implementation, a leaf switch has a bandwidth of at least 100 gigabits/s.

In a specific embodiment, a leaf switch comprises a receiver device configured to receive four communication channels, and each of the channels is capable of transferring incoming data at 25 gigabits/s and configured as a PAM-2 format. Similarly, a server (e.g. server 121) comprises communication interface that is configured to transmit and receive at 100 gigabits/sec (e.g., four channels at 25 gigabits/s per channel), and is compatible with the communication interface of the leaf switches. The spine switches, similarly, comprise communication interfaces for transmitting and receiving data in PAM format. The spine switches may have a large number of communication channels to accommodate a large number of leaf switches, each of which provides switching for a large number of servers.

The leaf switches are connected to spine switches. As shown in FIG. 1, each leaf switch is connected to spine switches 101 and 102. For example, leaf switch 111 is connected to the spine switch 101 and 102, and so are leaf switches 113 and 114. In a specific embodiment, each of the spine switches is configured with a bandwidth of 3.2 terabytes/s, which is big enough to communicate 32 optical communication links at 100 gigabits/s each. Depending on the specific implementation, other configuration and bandwidth are possible as well.

The servers, through the architecture 100 shown in FIG. 1, can communicate with one another efficiently with a high bandwidth. Optical communication links are used between servers and leaf switches, and also between leaf switches and spine switches, and PAM utilized for optical network communication.

Figure 2:
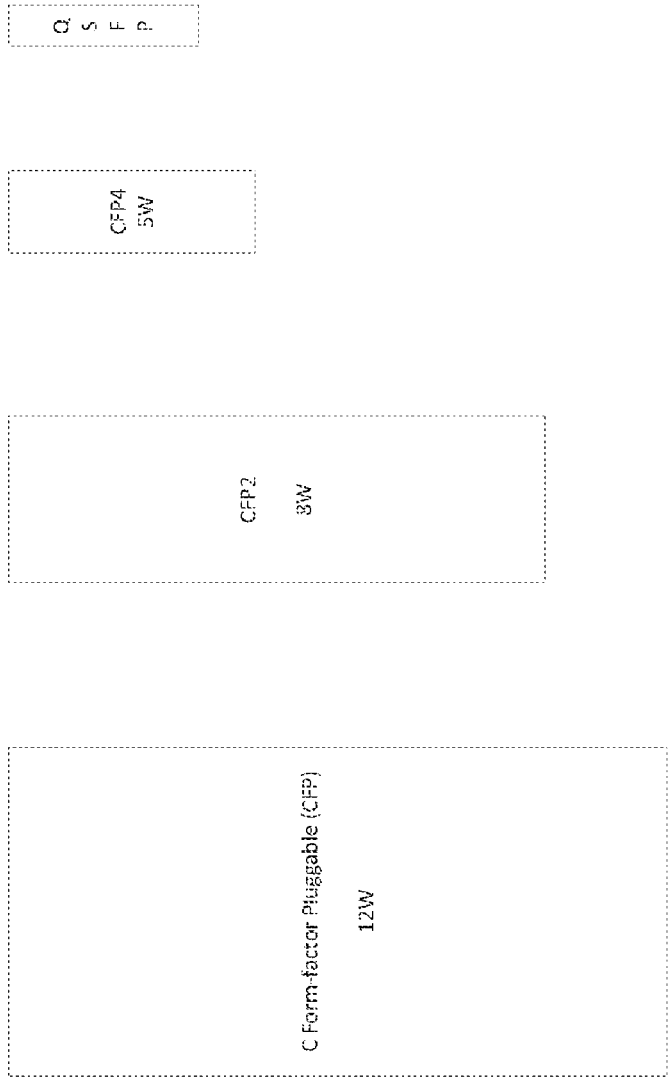
FIG. 2 is a simplified diagram illustrating the form factor of a communication device according to an embodiment of the present invention.

It is to be appreciated that the PAM communication interfaces described above can be implemented in accordance with today communication standards form factors. In addition, afforded by high efficiency level, network transceivers according to embodiments of the present invention can have much lower power consumption and smaller form factor compared to conventional devices. FIG. 2 is a simplified diagram illustrating the form factor of a communication device according to an embodiment of the present invention. Today, C form-factor pluggable (CFP) standard is widely adapted for gigabit network systems. Conventional electrical-connection based CFP transceivers often use 10×10 gigabits/s lines to achieve high bandwidth. With optical connection, CFP transceivers can utilize 10×10 gigabits/s configuration, 4×25 gigabits/s configuration, or others. It is to be appreciated that by utilizing optical communication link and PAM format, a transceiver according to the present invention can have a much smaller form factor than CFP and CFP2 as shown. In various embodiments, communication interfaces according to the invention can have a form factor of CFP4 or QSFP, which are much smaller in size than the CFP. In addition to smaller form factors, the power consumption of communication interfaces according to the present invention can be much smaller. In a specific embodiment, with the form factor of QSFP, the power consumption can be as low as about 3 W, which is about 1/4 that of convention transceivers with CFP form factor. The reduce level of power consumption helps save energy at data centers, where thousands (sometimes millions) of these communication devices are deployed.

Figure 3A:
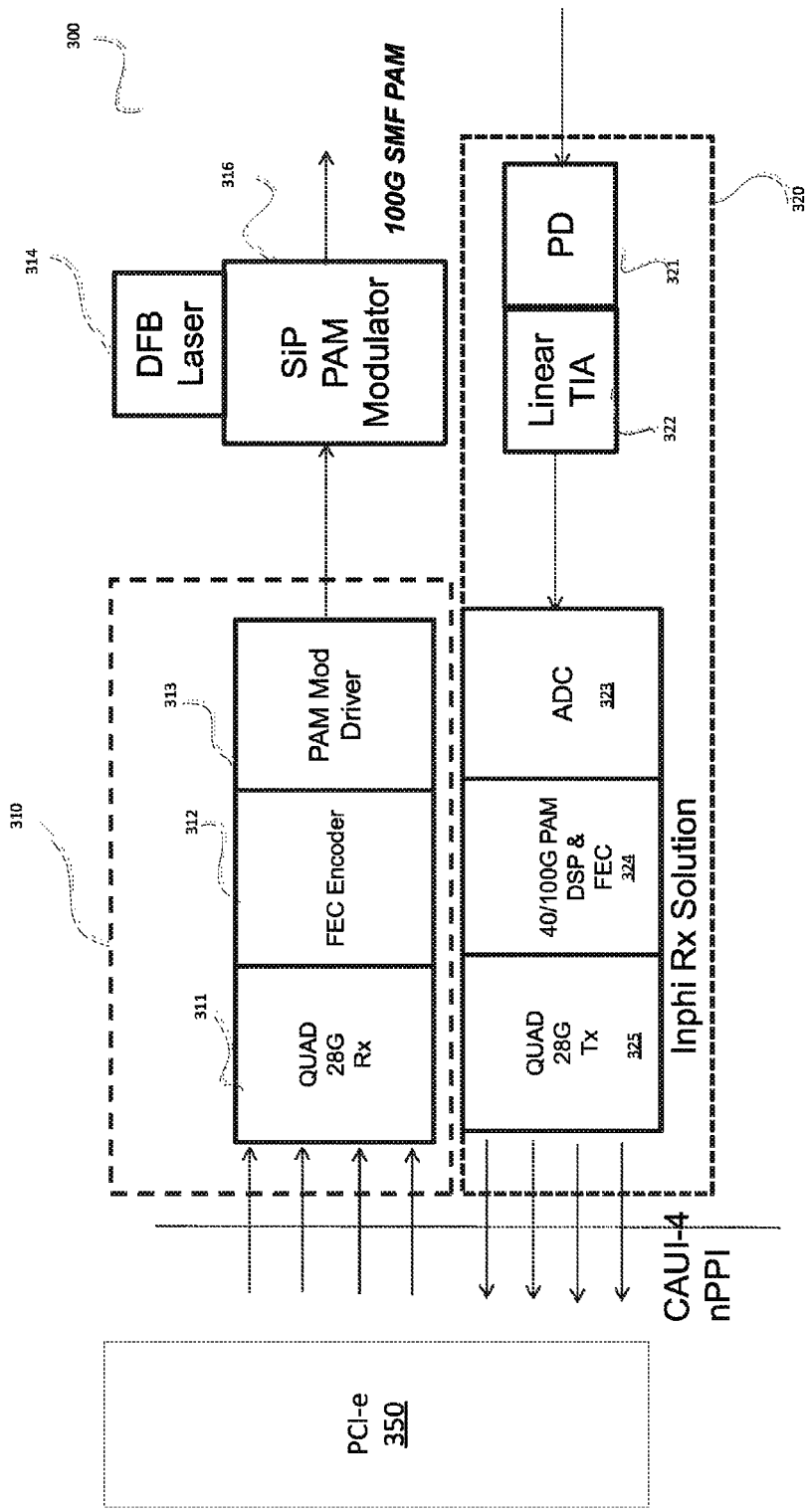
FIG. 3A is a simplified diagram illustrating a communication interface 300 according to an embodiment of the present invention.

FIG. 3A is a simplified diagram illustrating a communication interface 300 according to an embodiment of the present invention. This diagram is merely an example, which should not unduly limit the scope of the claims. One of ordinary skill in the art would recognize many variations, alternatives, and modifications. The communication interface 300 includes transmitter module 310 and a receiver module 320. The trasnsmitter module 310 comprises a receiver 311, encoder 312, and PAM modulation driver 313.

In an embodiment, the communication interface 300 is configured to receive incoming data at through four channels, where each channel is configured at 25 gigabits/s and configured as a PAM-2 format. Using the transmitter module 310, modulator 316, and the laser 314, the communication interface 300 processes data received at 25 gigabits/s from each of the four incoming channels, and transmits PAM modulated optical data stream at a bandwidth of 100 gigabits/s. It is to be appreciated that other bandwidths are possible as well, such as 40 Gbps, 400 Gbps, and/or others.

As shown the transmitter module 310 receives 4 channels of data. It is to be appreciated that other variants of pulse-amplitude modulation (e.g., PAM4, PAM8, PAM12, PAM16, etc), in addition to PAM-2 format, may be used as well. The transmitter module 310 comprises functional block 311, which includes a clock data recovery (CDR) circuit configured to receive the incoming data from the four communication channels. In various embodiments, the functional block 311 further comprises multiplexer for combining 4 channels for data. For example, data from the 4 channels as shown are from the PCE-e interface 350. For example, the interface 350 is connected to one or more processors. In a specific embodiment, two 2:1 multiplexers are employed in the functional block 311. For example, the data received from the four channels are high-speed data streams that are not accompanied by clock signals. The receiver 311 comprises, among other things, a clock signal that is associated with a predetermined frequency reference value. In various embodiments, the receiver 311 is configured to utilize a phase-locked loop (PLL) to align the received data.

The transmitter module 310 further comprises an encoder 312. As shown in FIG. 3, the encoder 312 comprises a forward error correction (FEC) encoder. Among other things, the encoder 312 provides error detection and/or correction as needed. For example, the data received is in a PAM-2 format as described above. The received data comprises redundancy (e.g., one or more redundant bits) helps the encoder 312 to detect errors. In a specific embodiment, low-density parity check (LDPC) codes are used. The encoder 312 is configured to encode data received from four channels as shown to generate a data stream that can be transmitted through optical communication link at a bandwidth 100 gigabits/s (e.g., combining 4 channels of 25 gigabits/s data). For example, each received is in the PAM-2 format, and the encoded data stream is a combination of four data channels and is in PAM-8 format. Data encoding and error correction are used under PAM format. The PAM formats as used in the embodiments of the present invention are further described below.

The PAM modulation driver 313 is configured to drive data stream encoded by the encoder 312. In various embodiments, the receiver 311, encoder 312, and the modulation driver 313 are integrated and part of the transmitter module 310.

The PAM modulator 316 is configured to modulate signals from the transmitter module 310, and convert the received electrical signal to optical signal using the laser 314. For example, the modulator 316 generates optical signals at a transmission rate of 100 gigabits per second. It is to be appreciated that other rate are possible as well, such as 40 Gbps, 400 Gbps, or others. The optical signals are transmitted in a PAM format (e.g., PAM-8 format, PAM12, PAM 16, etc.). In various embodiments, the laser 314 comprises a distributed feedback (DFB) laser. Depending on the application, other types of laser technology may be used as well, as such vertical cavity surface emitting laser (VCSEL) and others.

Figure 3B:
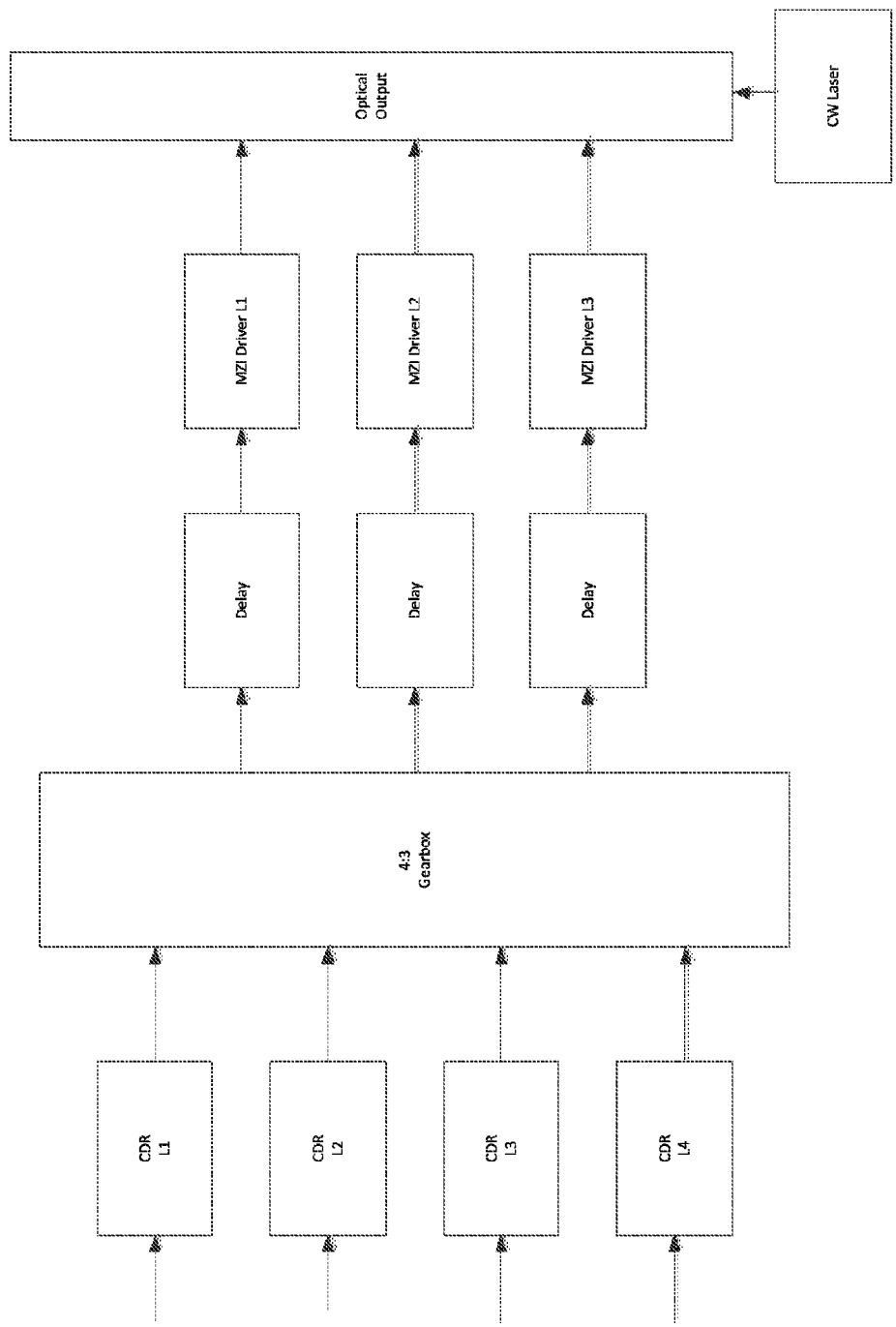
FIG. 3B is a simplified diagram illustrating a segmented optical modulator according to an embodiment of the present invention.

FIG. 3B is a simplified diagram illustrating a segmented optical modulator according to an embodiment of the present invention. This diagram is merely an example, which should not unduly limit the scope of the claims. One of ordinary skill in the art would recognize many variations, alternatives, and modifications. For example, modulated PAM signals modulated for transmission over optical communication links.

Now referring back to FIG. 3A. The communication interface 300 is configured for both receiving and transmitting signals. A receiver module 320 comprise a photo detector 321 that converts incoming data signal in an optical format converts the optical signal to an electrical signal. In various embodiments, the photo detector 321 comprises indium gallium arsenide material. For example, the photo detector 321 can be a semiconductor-based photodiode, such as p-n photodiodes, p-i-n photodiodes, avalanche photodiodes, or others. The photo detector 321 is coupled with an amplifier 322. In various embodiments, the amplifier comprises a linear transimpedance amplifier (TIA). It is to be appreciated by using TIA, long-range multi-mode (LRM) at high bandwidth (e.g., 100 Gb/s or even larger) can be supposed. For example, the TIA helps compensate for optical dispersion in electrical domain using electrical dispersion compensation (EDC). In certain embodiments, the amplifier 322 also includes a limiting amplifier. The amplifier 322 is used to produce a signal in the electrical domain from the incoming optical signal. In certain embodiments, further signal processing such as clock recovery from data (CDR) performed by a phase-locked loop may also be applied before the data is passed on.

The amplified data signal from the amplifier 322 is processed by the analog to digital converter (ADC) 323. In a specific embodiment, the ADC 323 can be a baud rate ADC. For example, the ADC is configured to convert the amplified signal into a digital signal formatted into a 100 gigabit per second signal in a PAM format. The functional block 324 is configured to process the 100 Gb/s data stream and encode it into four at streams at 25 Gb/s each. For example, the incoming optical data stream received by the photo detector 321 is in PAM-8 format at a bandwidth of 100 Gb/s, and at block 324 four data streams in PAM-2 format is generated at a bandwidth of 25 Gb/s. The four data streams are transmitted by the transmitter 325 over 4 communication channels at 25 Gb/s.

It is to be appreciated that there can be many variations to the embodiments described in FIG. 3. For example, different number of channels (e.g., 4, 8, 16, etc.) and different bandwidth (e.g., 10 Gb/s, 40 Gb/s, 100 Gb/s, 400 Gb/s, 3.2 Tb/s, etc.) can be used as well, depending on the application (e.g., server, leaf switch, spine switch, etc.).

Figure 4A:
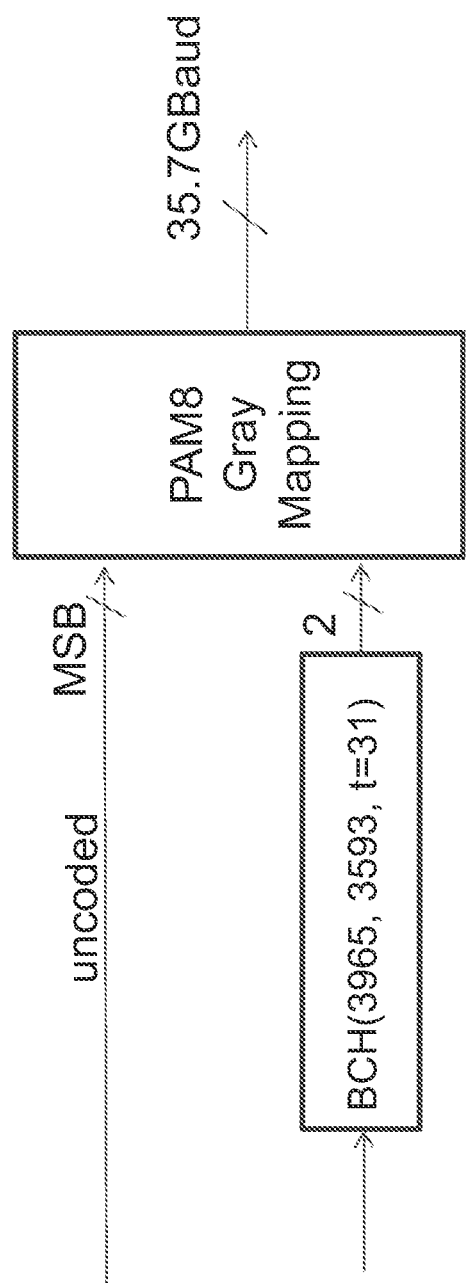
FIG. 4A is a simplified diagram illustrating a PAM-8 format according to an embodiment of the invention.
Figure 4B:
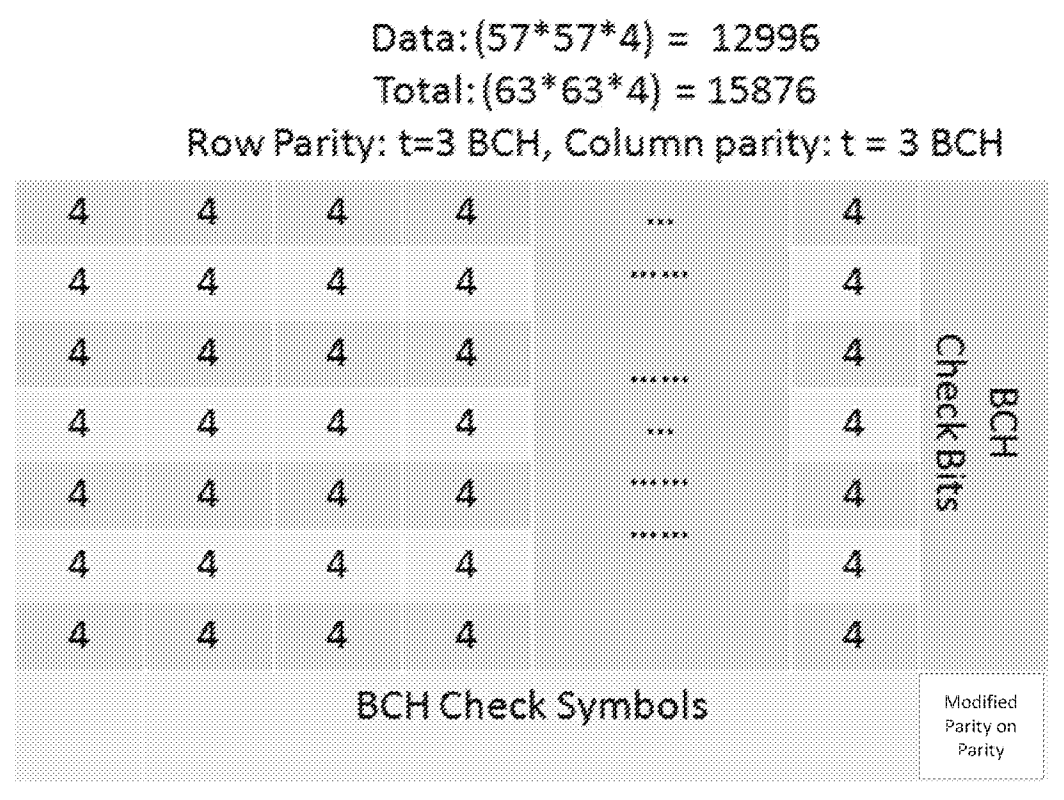

The PAM modulation can be implemented in various ways. FIG. 4A is a simplified diagram illustrating a PAM-8 format according to an embodiment of the invention. This diagram is merely an example, which should not unduly limit the scope of the claims. One of ordinary skill in the art would recognize many variations, alternatives, and modifications. As shown in FIG. 4A, BCH code and uncoded data (most significant bit)

are mapped by PAM8 Gray mapping. In an implementation, the total FEC efficiency is 100 ns, and the system has very low latency. FIG. 4B is simplified diagram illustrating the use of BCH check symbols for PAM mapping. As shown, a modified parity on parity scheme is used. It is to be appreciated that modified parity on parity scheme is used to accommodate overlapping cases for BCH coding.

Figure 5:
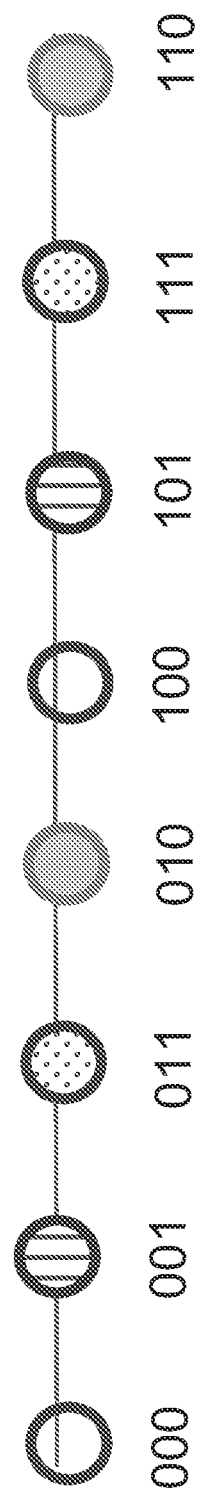
FIG. 5 is a simplified diagram illustrating a PAM8 coding scheme according to an embodiment of the present invention.

FIG. 5 is a simplified diagram illustrating a PAM8 coding scheme according to an embodiment of the present invention. This diagram is merely an example, which should not unduly limit the scope of the claims. One of ordinary skill in the art would recognize many variations, alternatives, and modifications. As shown, two least significant bits (LSB) uniquely identify the subset. The two LSB's are gray coded. BCH code is applied on the subset. Gray code keeps $P_b$ (bit error probability)=$\frac{1}{2}*P_{se}$ (probability of symbol error). The bits within a subset have 12 dB (×4) separation and no code is applied. For example, the combined rate would be (2*0.9062+1)/3=0.9375, where the total overhead is 1.0667, and the Ethernet rate is 100/3*257/256*1.0667=35.7 GBaud. It is to be appreciated that the coding scheme illustrated in FIG. 8 can be used in other PAM8 optical communication networks as well.

Figure 6:
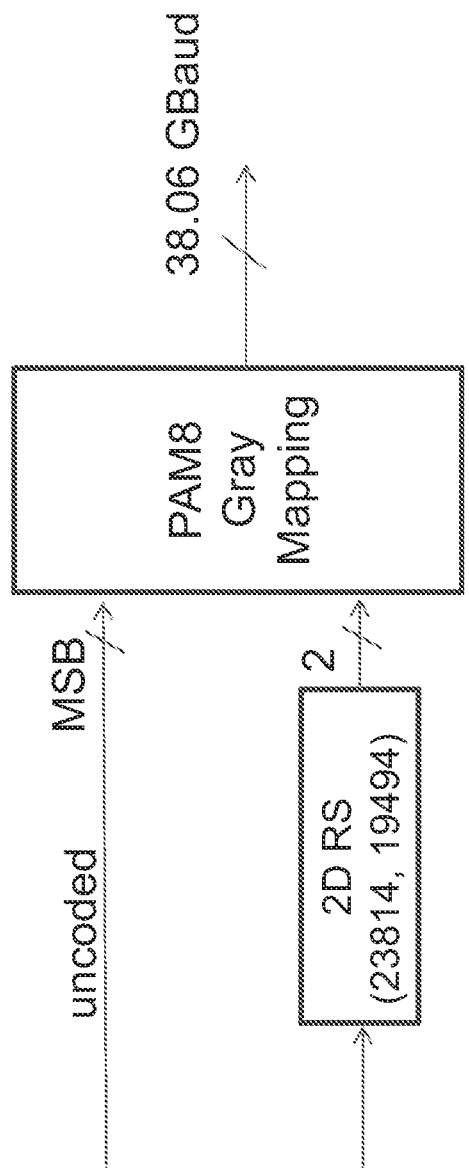
FIG. 6 is a simplified diagram illustrating a PAM8 coding scheme with high coding gain.

FIG. 6 is a simplified diagram illustrating a PAM8 coding scheme with high coding gain. This diagram is merely an example, which should not unduly limit the scope of the claims. One of ordinary skill in the art would recognize many variations, alternatives, and modifications. As shown in FIG. 6, 2D RS code and uncoded data (most significant bit) are mapped by PAM8 Gray mapping to generate a 38.06 GBaud. For example, in this scenario, the PAM mapping provides a combined rate of (2*0.8186+1)/3=0.8791; the total overhead is 13.76%; and Ethernet Rate is 100/3*257/256*1.1376=38.06 GBaud. The block Latency is about 350 ns (e.g., 23,814 bits @67G). Processing latency is also 350 ns, which makes total latency about 700 ns.

According to another embodiment, RS product codes are used for coded data. For example, a number of other iterative codes can be used instead of the RS. BCH×BCH and BCH×RS are examples that can provide higher performance or lower latency. As an example, the specification of the RS product codes is provided in Table 1 below:

TABLE 1

Data: (57*57*6) = 19494
Total: (63*63*6) = 23814
Row Parity: t = 3 RS, Column parity: t = 3 RS

| 6 | 6 | 6 | 6 | ... | 6 | RS Check Bits |
|---|---|---|---|-----|---|---------------|
| 6 | 6 | 6 | 6 | ... | 6 | |
| 6 | 6 | 6 | 6 | ... | 6 | |
| 6 | 6 | 6 | 6 | ... | 6 | |
| 6 | 6 | 6 | 6 | ... | 6 | |
| 6 | 6 | 6 | 6 | ... | 6 | |
| 6 | 6 | 6 | 6 | | 6 | |
| | | RS Check Symbols | | | | Parity on Parity |

For example, in this implementation
block latency is about 315 ns (23,814 bits at 76G)
Processing Latency is about 285 ns
Total Latency is about 600 ns
RS code: perf: 8.8E-3
Raw overhead is about 22.16%
Total overhead is about 13.76%

Table 2 below illustrates the specification and performances associated with various PAM formats used in optical communication network according to embodiments of the present invention.

TABLE 2

| | PAM8 with BCH Option 1: (Low latency) | PAM8 with 2D RS Option 2: (High Gain) | PAM12 with 2D RS | PAM16 with 2D RS |
|---|---|---|---|---|
| Baud rate | 35.7G | 38.06G | 32G | 27.6G |
| FEC Target BERi for 1e-15 BERo | 1E-3 | 8.8E-3 | 8.8E-3 | 8.8E-3 |
| FEC Latency | 100 ns | 600 ns | 660 ns | 716 ns |
| Required SNR | 22.9 dB | 20.6 dB | 24.2 dB | 26.7 dB |
| Tot Coding Overhead (Coset OH) | 6.67% | 13.76% | 11.56% | 9.97% |
| Coding gain | 8.4 dB | 10.5 dB | 10.5 dB | 10.5 dB |

Figure 7:
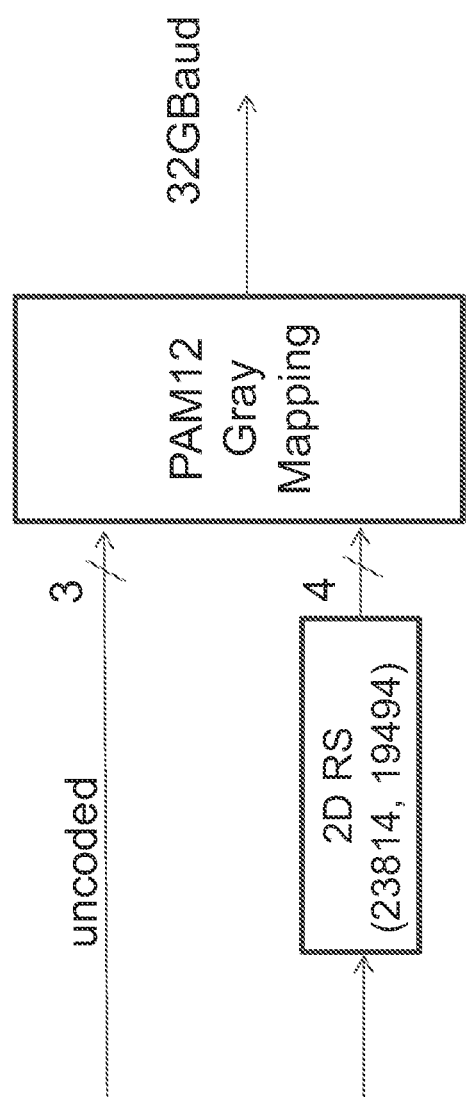
FIG. 7 is a simplified diagram illustrating PAM-12 mapping according to an embodiment of the present invention.

FIG. 7 is a simplified diagram illustrating PAM-12 mapping according to an embodiment of the present invention. This diagram is merely an example, which should not unduly limit the scope of the claims. One of ordinary skill in the art would recognize many variations, alternatives, and modifications.

For the PAM12 mapping illustrated in FIG. 7, 2D RS provided over 2 symbols. For PAM12 Gray (e.g., Gray binary code) mapping, three uncoded bits and 4 coded bits (from 16 cosets) are Gray mapped. A rate of 57G throughput on FEC can be accomplished. The combined Rate can be (4*0.8186+3)/7=0.8963. The total overhead as calculated is about 11.56%. The rate is calculated at 100/3.5*257/256*1.1156, which is about 32 GBaud.

As an example, 128 points of PAM12 are constructed by 2D PAM12 mapping. 2D constellation is constructed from 2 successive unipolar PAM symbols in time and removing the outermost 16 points. A gray mapping of the coded bits is used and a BCH×BCH 2D product code is used for the coded bits. The block latency of this code is about 248 ns and the correction capability of the iterative code is 1E-12. The total latency of the code is expected to be less than 500 ns.

In an implementation, a low latency dedicated mode is also provided, where a BCH code is used as the coset code. An example is BCH(511, 421, t=10). This code can correct an input BER of 6E-4 for 1E-15 BER. The latency of this code is expected to be less than 50 ns.

Figure 8:
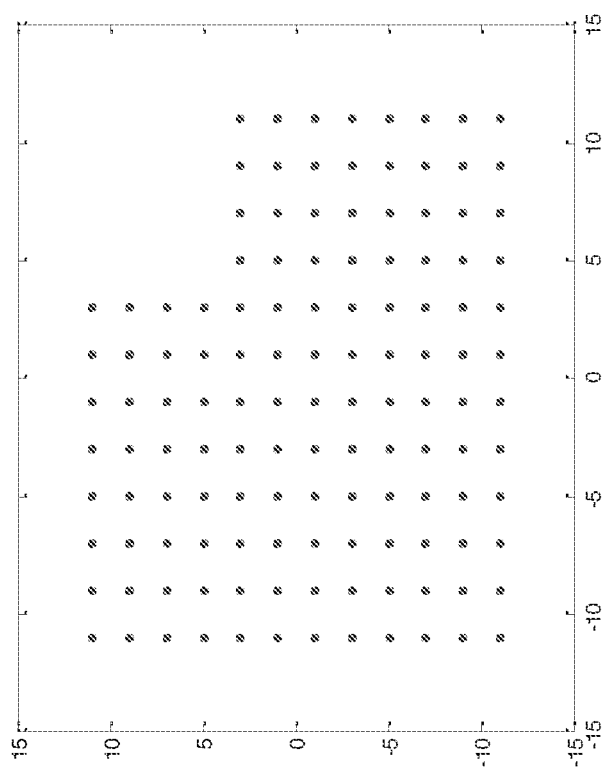
FIG. 8 is a simplified diagram illustrating a constellation for PAM12 mapping.

FIG. 8 is a simplified graph illustrating the PAM-12 mapping. For example, in a high performance mode, a 12 dB coset partitioning is provided. There are 16 cosets with 8 points per coset.

For example, the Gray mapping can be accomplished using the following formula:

$$Y(n)=X1*8+X2$$

$$Y(n+1)=Y1*8+Y2$$

FIG. 9 is a simplified diagram illustrating PAM 12 mapping according to an embodiment of the present invention. For example, tables in FIG. 9 illustrates the Gray mapping process, where input codes are illustrated in FIG. 7.

Figure 10:
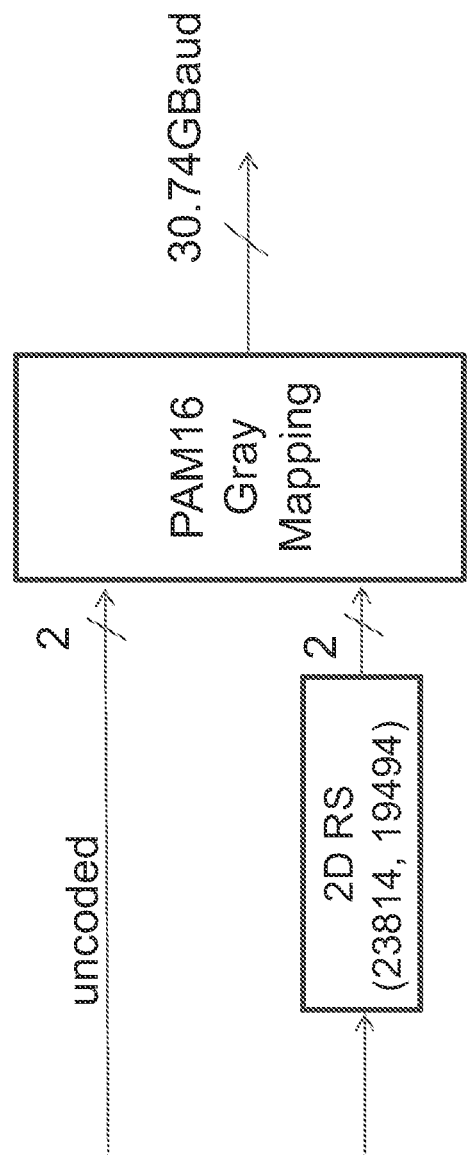
FIG. 10 is a simplified diagram illustrating PAM16 mapping according to an embodiment of the present invention.
Figure 11:
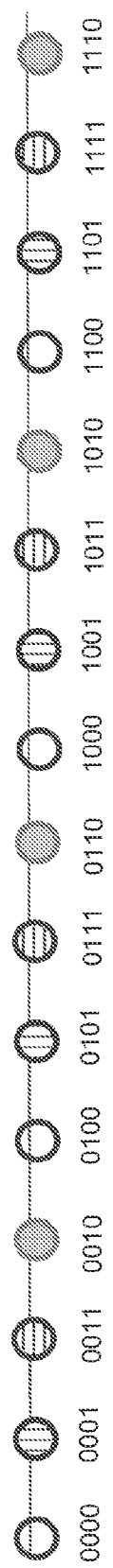
FIG. 11 is a simplified diagram illustrating PAM16 coding scheme.

FIG. 10 is a simplified diagram illustrating PAM16 mapping according to an embodiment of the present invention. This diagram is merely an example, which should not unduly limit the scope of the claims. One of ordinary skill in the art would recognize many variations, alternatives, and modifications. FIG. 11 is a simplified diagram illustrating PAM16 coding scheme. In PAM16 mapping according to embodiments of the present invention, 2 LSB's uniquely identify the subset, and 2 LSB's are Gray coded. A strong code is applied. The Gray code keeps $P_b$ (bit error probability) low at $\frac{1}{2}*P_{se}$ (probability of symbol error). The bits within a subset have 12 dB (×4) separation. The MSB bits are not Gray coded. No code is applied. The combined rate is (2*0.8186+2)/4=0.9093. Total overhead is about 9.97%. The rate is about 100/4*257/256*1.0997=27.6 GBaud.

Table 3 below compares PAM16 mapping and PAM12 mapping:

TABLE 3

|  | PAM16 with BCHxBCH | PAM12 With 2D mapping BCHxBCH |
| --- | --- | --- |
| Baud rate | 28G | 32G |
| FEC Target BERi for 1e-15 BERo | 1.3E-2 | 1.3E-2 |
| Block Latency | 284 ns | 248 ns |
| Required SNR | 26.1 dB | 23.6 dB |
| Tot Coding Overhead (Coset OH) | 11% (22%) | 12.5% (22%) |
| Coding gain | 11 dB | 11 dB |
| Coded OH gain | 200% | 175% (7/4) |

Embodiments of the present invention provides an adaptive ECC code which uses iterative algebraic decoding for excellent performance and high throughput. In various analyses, it can be shown that the code does not have error floors. Usually, various methods of achieving good performance involve iterative decoding rather than a single algebraic step. To achieve high reliability and an efficient implementation with a high degree of parallel processing, a systematic construction is preferable to the more randomly structured parity checks of low-density parity-check (LDPC).

FIG. 12 is a simplified diagram illustrating BCH code construction according to an embodiment of the present invention. This diagram is merely an example, which should not unduly limit the scope of the claims. One of ordinary skill in the art would recognize many variations, alternatives, and modifications. In an implementation, code construction is based on Elias 2-D product code. However, unlike the Elias construction where a row and column code overlap in a single bit, code construction according to implementations of the present invention has an overlap in multiple (4) bits. FIG. 12 shows that 4 bits are shared by a row and column code. There are 63 Row codes and 63 column codes. The row codes can correct 3 bit errors (BCH) and column codes 2 symbol errors (RS). For example, the constituent BCH codes use an extended BCH construction with the polynomial extension $(x^2+x+1)$, which results in 2 additional parity check bits. Decoding is performed by iterating between all the row code words and then column code words, which is then iterated. In the first step all 63 row code words can be processed simultaneously. Then column decoding is performed. If the correction results of the 2 decoders agree, then the decoding process proceeds with the correction. Subsequent iterations can involve only syndrome updates (32 bits) instead of the entire data sequence.

An example of coding performance is provided below:
158 errors.
iter=0->1.587600e+02 Uncorrected=1.000000e+00
iter=1->7.323707e+01 Uncorrected=4.613068e-01
iter=2->8.237902e+00 Uncorrected=1.124827e-01
iter=3->5.488719e-02 Uncorrected=6.662763e-03
iter=4->3.757043e-08 Uncorrected=6.845027e-07
iter=5->0.000000e+00 Uncorrected=0.000000e+00
iter=6->0.000000e+00 Uncorrected=0.000000e+00
Corrected @iter 1=85.522926
Corrected @iter 2=64.999172
Corrected @iter 3=8.183015
Corrected @iter 4=0.054887
Corrected @iter 5=0.000000
Corrected @iter 6=-0.000000
Failure limit is around 320 errors. Barely passing:
iter=0->3.175200e+02 Uncorrected=1.000000e+00
iter=1->2.789975e+02 Uncorrected=8.786768e-01
iter=2->2.282819e+02 Uncorrected=8.182222e-01
iter=3->2.025121e+02 Uncorrected=8.871140e-01
iter=4->1.859360e+02 Uncorrected=9.181477e-01
iter=5->1.738651e+02 Uncorrected=9.350801e-01
iter=6->1.643340e+02 Uncorrected=9.451814e-01
iter=7->1.563500e+02 Uncorrected=9.514157e-01
iter=8->1.493429e+02 Uncorrected=9.551834e-01
iter=9->1.429502e+02 Uncorrected=9.571948e-01
iter=10->1.369185e+02 Uncorrected=9.578057e-01
iter=11->1.310527e+02 Uncorrected=9.571582e-01
iter=12->1.251863e+02 Uncorrected=9.552361e-01
iter=13->1.191615e+02 Uncorrected=9.518739e-01
iter=14->1.128135e+02 Uncorrected=9.467277e-01
iter=15->1.059546e+02 Uncorrected=9.392012e-01
iter=16->9.835746e+01 Uncorrected=9.282981e-01
iter=17->8.973582e+01 Uncorrected=9.123438e-01
iter=18->7.972556e+01 Uncorrected=8.884474e-01
iter=19->6.788185e+01 Uncorrected=8.514441e-01
iter=20->5.375044e+01 Uncorrected=7.918234e-01
iter=21->3.720012e+01 Uncorrected=6.920895e-01
iter=22->1.949128e+01 Uncorrected=5.239575e-01
iter=23->5.280887e+00 Uncorrected=2.709358e-01
iter=24->2.329760e-01 Uncorrected=4.411684e-02
iter=25->4.052817e-05 Uncorrected=1.739585e-04
iter=26->2.907199e-16 Uncorrected=7.173281e-12
iter=27->0.000000e+00 Uncorrected=0.000000e+00
iter=28->0.000000e+00 Uncorrected=0.000000e+00
Corrected @iter 1=38.522550
Corrected @iter 2=50.715551
Corrected @iter 3=25.769821
Corrected @iter 4=16.576084
Corrected @iter 5=12.070937
Corrected @iter 6=9.531039
Corrected @iter 7=7.984049
Corrected @iter 8=7.007077
Corrected @iter 9=6.392659
Corrected @iter 10=6.031685
Corrected @iter 11=5.865839
Corrected @iter 12=5.866434
Corrected @iter 13=6.024731
Corrected @iter 14=6.348004
Corrected @iter 15=6.858932
Corrected @iter 16=7.597150
Corrected @iter 17=8.621639
Corrected @iter 18=10.010263
Corrected @iter 19=11.843703
Corrected @iter 20=14.131410
Corrected @iter 21=16.550326
Corrected @iter 22=17.708836
Corrected @iter 23=14.210394
Corrected @iter 24=5.047911
Corrected @iter 25=0.232936
Corrected @iter 26=0.000041
Corrected @iter 27=0.000000
Corrected @iter 28=-0.000000
For example, the average probability of error is calculated below:

$$f_{zero}(@(p2)N*p2+8*\text{sqrt}(N*p2*(1-p2))-324,1.36e-2)=0.0132$$

According to the calculation, the average probability of error, which results in a maximum number of errors of 324 at a probability of 1E-15 (8 sigma) is computed to be 1.32E-2.

Table 4 below is provided to illustrate error floor:

TABLE 4

| | | | |
|---|---|---|---|
| x | x | x | x |
| x | x | x | x |
| x | x | x | x |
| x | x | x | x |

For example, if each 4 bit cell in the example has at most 1 error, then a 4×4 error pattern can cause an error floor. Such a pattern is shown below. Each X is 1 bit error. The probability of such a pattern is: nchoosek(63, 4)*nchoosek(63, 4)*(1−(1−p)^4)^16*16/63^2. An error floor results at p=5.5e-3 for 1E-18 output BER (1E-15 frame error rate). However, the presence of such a killer pattern can be detected by the row and column decoders. We can then use an erasure decoding algorithm for the BCH. In the erasure decoding case, we can correct 6 errors for each constituent code.

In an implementation, BCH code the erasure detection is provided. The column decoder signals to the row decoders the bits that cannot be corrected. Once these locations are known, two scenarios are attempted. An all 1's pattern is assumed and decoding is attempted. If this fails an all 0's pattern is assumed and decoding is attempted. This ensures the correction of 2t (i.e.) 6 errors for the example code.

There can be various types of error patterns where multiple errors can happen within one 4-bit cell. One such pattern is shown in Table 5 below:

TABLE 5

| | |
|---|---|
| 3 | 4 |
| 4 | 3 |

Figure 13:
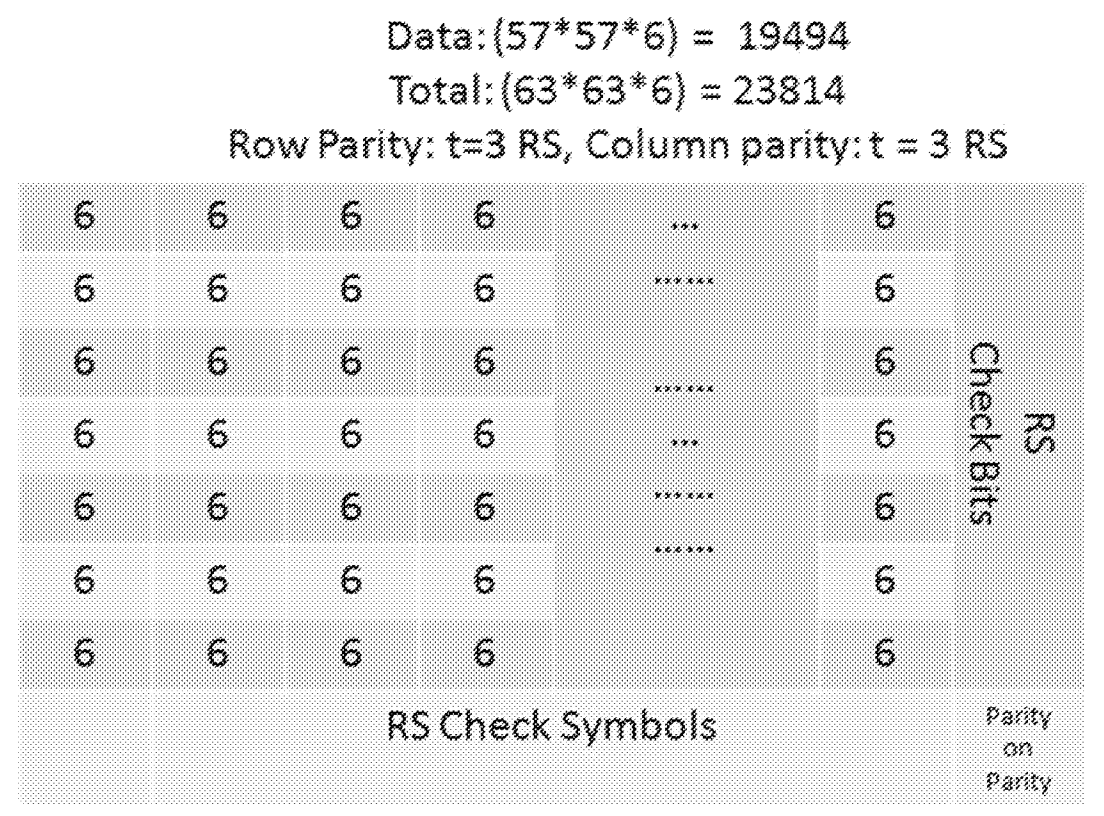

FIG. 13 is a simplified diagram illustrating Reed-Solomon (RS) code construction used in PAM format according to embodiments of the present invention. This diagram is merely an example, which should not unduly limit the scope of the claims. One of ordinary skill in the art would recognize many variations, alternatives, and modifications. For example, in comparison to BCH code construction described above, RS code may have a higher level of latency, but it does not have error floor issues. For example, the block latency is 372 ns for PAM12 format, and the performance is $8.8e^{-3}$.

Figure 14:
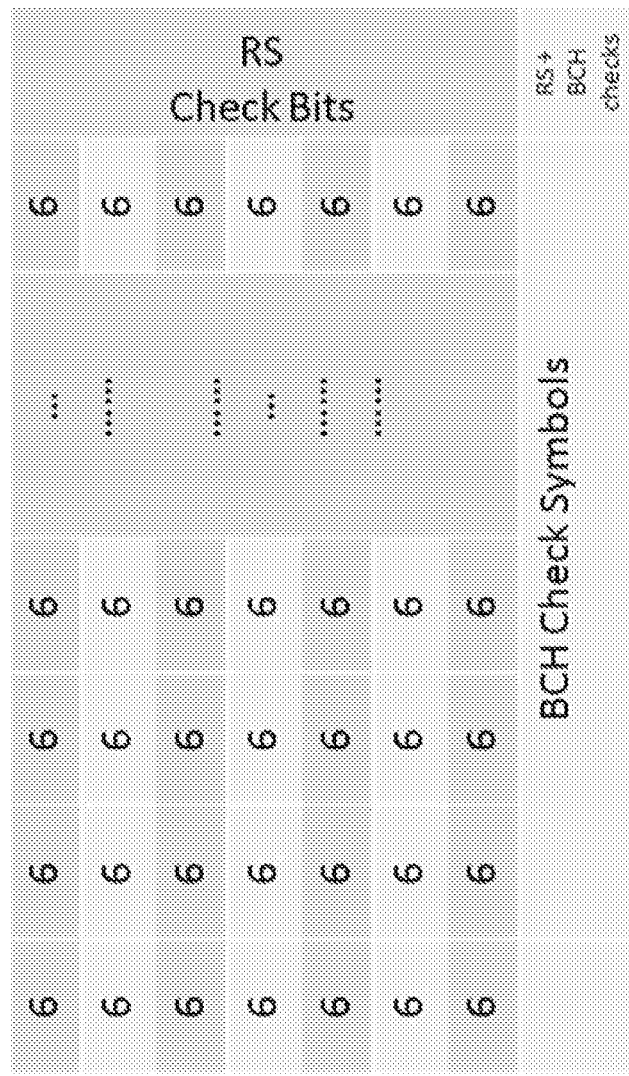
FIG. 14 is a simplified diagram illustrating BCH-RS coding for PAM12 format according to an embodiment of the present invention.

In addition to BCH or RS coding scheme, certain implementations of the present invention uses BCH-RS code construction for PAM format. For example, this code has a minimum distance that is the product of the 2 codes (dmin=49). Hence it does not have error floor issues. The block latency can be about 272 ns for PAM12, and the performance is about $9.2E^{-3}$. FIG. 14 is a simplified diagram illustrating BCH-RS coding for PAM12 format according to an embodiment of the present invention. This diagram is merely an example, which should not unduly limit the scope of the claims. One of ordinary skill in the art would recognize many variations, alternatives, and modifications.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A leaf spine server system comprising:
a spine switch configured to direct communication at a rate of about 100 Gigabit per seconds using a pulse amplitude modulation ("PAM") format between a plurality of leaf switches over optical communication links, each of the plurality of leaf switches being coupled to a plurality of servers configured within a rack, the plurality of leaf switches including a first switch and a second switch, a first server being configured to communicate with a second server through the first switch and the second switch, the spine switch comprising a transmitter module comprising:
a receiver device configured to receive four communication channels, each of the channels being capable of transferring incoming data at 25 Gbps and configured as a PAM-2 format;
a clock data recovery circuit configured to receive the incoming data from the four communication channels;
an encoder to format the incoming data from the four channel communications to generate an encoded incoming data, the encoded incoming data comprising a data stream for transmitting through an optical network, wherein the encoded incoming data comprises multi-dimensional-BCH codes using a polynomial extension and having overlap in multiple bits;
a driver device configured to drive the encoded incoming data; and
a PAM modulator configured to receiving the encoded incoming data and transferring an outgoing signal at a rate of at least 40 Gbps per second using a PAM format.

2. The system of claim 1 wherein the leaf spine server system is provided in a data center.

3. The system of claim 1 wherein the rate is 40 Gbps, 100 Gbps, or 400 Gbps.

4. The system of claim 1 wherein the PAM format is PAM4, PAM8, PAM12, or PAM16.

5. The system of claim 1 wherein the encoded incoming data comprises multi-dimensional RS codes.

6. The system of claim 1 wherein the encoded incoming data comprises BCH-RS codes.

7. The system of claim 1 wherein the PAM modulator comprises a segmented optical modulator.

8. The system of claim 1 wherein the transmitter module further comprising DFB laser.

9. The system of claim 1 wherein the transmitter device comprises one or more multiplexer for processing data received from the four communication channels.

10. The system of claim 1 wherein the PAM modulator comprises a silicon photonic apparatus for generating modulated optical signals.

11. The system of claim 1 wherein the encoder is configured to perform forward error correction.

12. The system of claim 1 further comprising a plurality of servers that are connected to the leaf switches via optical communication links 13. The system of claim 1 wherein spine switch further comprises a receiver module, the receiver module comprising:
a photo detector device configured to receive an incoming data signal in an optical format and transferring an electrical signal;
a TIA device configured to receive the electrical signal and amplifying the signal into an amplified signal;
an analog to digital converter configured to receive the amplified signal into a digital signal formatted into a 100 Gigabit per second signal in a PAM format;

a transmitter device configured to receive the 100 Gigabit per second signal into four outgoing data signals each at 25 Gbps configured in a PAM-2 format.

14. A server system comprising:
a transmitter module, the transmitter module comprising:
a photo diode device configured to receive an incoming data signal in an optical format and transferring an electrical signal;
a TIA device configured to receive the electrical signal and amplifying the electrical signal into an amplified signal;
an analog to digital converter configured to receive the amplified signal into a digital signal formatted into a 100 Gigabit per second signal in a PAM format;
a forward error correction module for encoding the 100 Gigabit per second signal into four data streams into four outgoing data signals each at 25 Gbps configured in a PAM-2 format, the encoded comprising multi-dimensional-BCH codes using a polynomial extension and having overlap in multiple bits;
a transmitter device configured to receive the four outgoing data signals; and
a PCI-e interface for receiving the four outgoing data signals.

15. The system of claim 14 wherein the PAM format is a PAM4, PAM8, PAM12, or PAM16 format.

16. The system of claim 14 wherein the analog to digital converter comprises a baud rate ADC.

17. The system of claim 14 further comprising a CDR for processing the amplified signal.

18. The system of claim 14 wherein the TIA further comprising a limiting amplifier.

19. The system of claim 14 wherein the TIA is configured to provide electrical dispersion compensation.

20. The system of claim 12 further comprising a module member, the module member being configured with a region for spatially configuring a silicon photonics device; and a plurality of interconnects coupling the transmitter module and the receiver module being monothically integrated on a single integrated circuit platform.

21. The system of claim 20 wherein the single integrated circuit platform has a power consumption of less than three watts.

22. The system of claim 20 wherein the single integrated circuit platform comprises a PCB.

23. A communication interface apparatus in a leaf-spine data communication system comprising:
a receiver device configured to receive four communication channels, each of the channels being capable of transferring incoming data as a PAM-2 format;
a clock data recovery circuit configured to receive the incoming data from the four communication channels;
an encoder to format the incoming data from the four channel communications to generate an encoded incoming data, the encoded incoming data comprising a data stream for transmitting through an optical network, the encoded incoming data comprising multi-dimensional-BCH codes using a polynomial extension and having overlap in multiple bits;
a driver device configured to drive the encoded incoming data;
a PAM modulator configured to receiving the encoded incoming data and transferring an outgoing signal using an output PAM format; and
a laser device configured to generate an optical signals for modulating the outgoing signal;
wherein the leaf-spine data communication system comprises a first leaf switch and a second leaf switch, the first leaf switch being connected to a first server and a second server, the second leaf switch being connected to the second server and a third server.

24. The apparatus of claim 23 wherein the PAM modulator is formed on a silicon-on-insulator (SOI) structure.

25. The apparatus of claim 23 further comprising output waveguide.

* * * * *